UNITED STATES PATENT OFFICE.

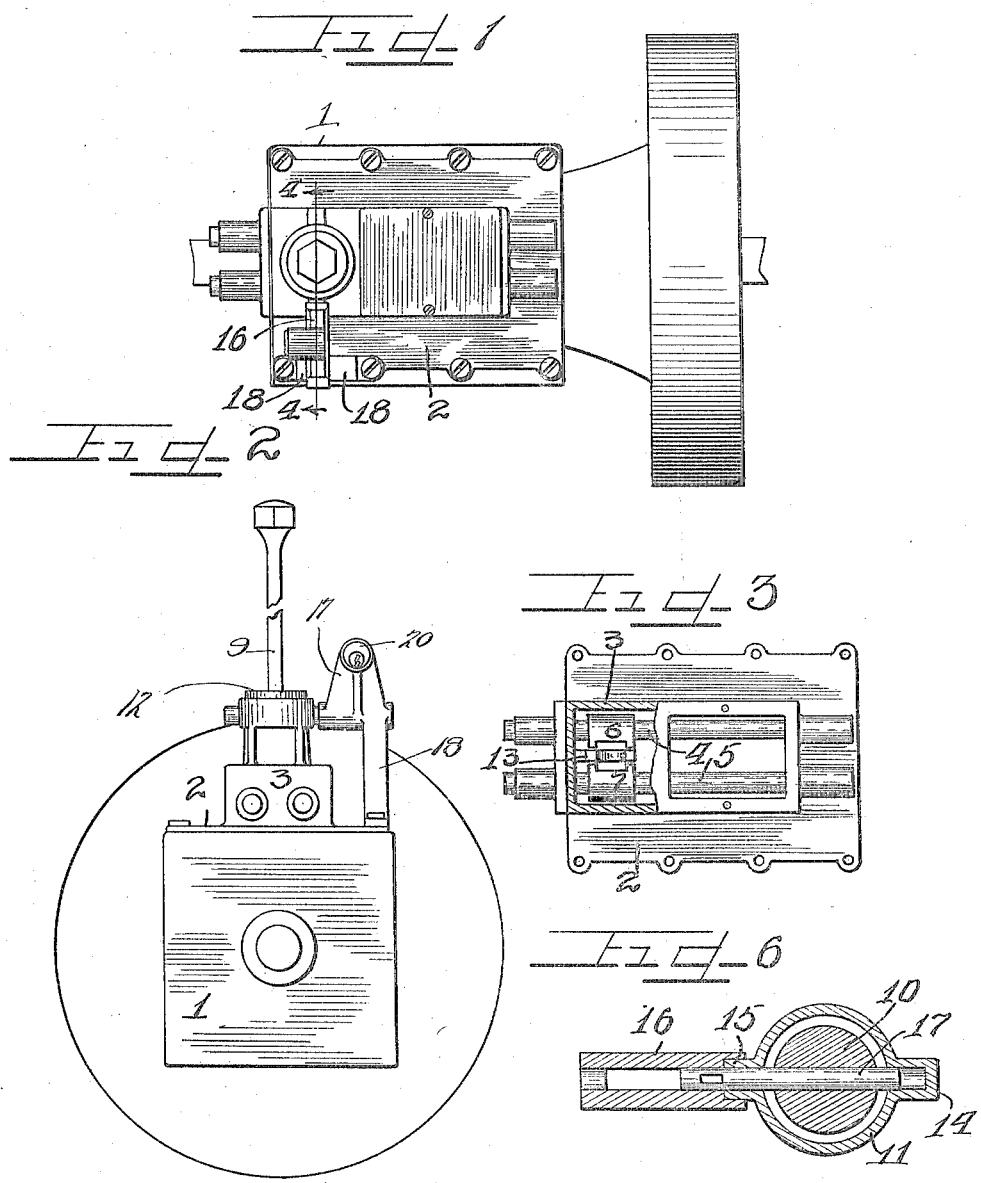

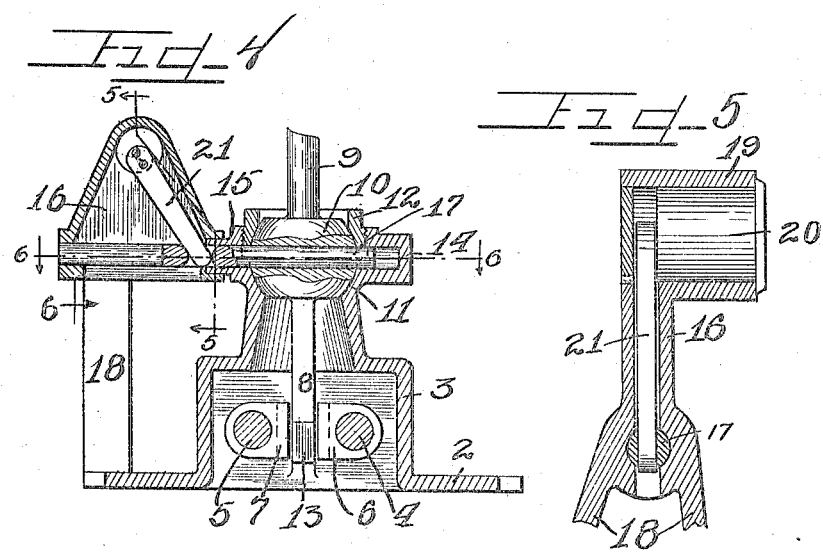
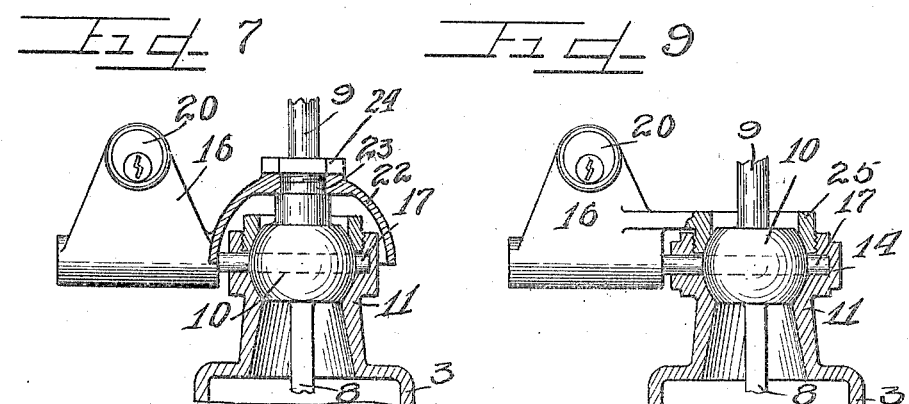
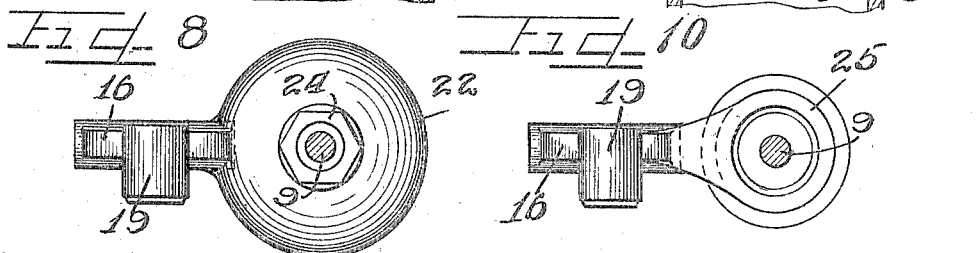

JOHN H. IMHOFF, OF CHICAGO, ILLINOIS, ASSIGNOR, BY MESNE ASSIGNMENTS, TO JOHNSON AUTOMOBILE LOCK CO., OF CHICAGO, ILLINOIS, A CORPORATION OF ILLINOIS.

GEAR-LOCK.

1,273,372.  Specification of Letters Patent.  Patented July 23, 1918.

Application filed July 16, 1915. Serial No. 40,151.

*To all whom it may concern:*

Be it known that I, JOHN H. IMHOFF, a citizen of the United States, and a resident of the city of Chicago, in the county of Cook and State of Illinois, have invented certain new and useful Improvements in Gear-Locks; and I do hereby declare that the following is a full, clear, and exact description of the same, reference being had to the accompanying drawings, and to the numerals of reference marked thereon, which form a part of this specification.

The widespread theft of automobiles has caused considerable inconvenience and annoyance to owners, and although various locking devices have been constructed for the purpose of locking the ignition system, the fuel supply, or the gear shift of a car, in a great many instances the locking means are so exposed as to be readily broken. This is particularly so of locks for application to the gear shift, as generally a padlock is used, and it is an easy matter to break and open the same.

This invention, however, relates to a lock for the gear shift of a motor car which is integrally associated therewith so as to form a part thereof, and which cannot be broken or damaged without injury to the gear shift itself, so that in any event the car is protected from theft.

It is an object therefore of this invention to lock the gear shift lever of a motor car transmission in a fixed position against unauthorized use.

It is also an object of this invention to provide a device for locking the gear lever of an automobile transmission in neutral position to prevent actuation thereof and shifting of the gears by an unauthorized person.

It is also an object of this invention to provide a lock for the gear shift lever of an automobile transmission of the ball and socket type acting when locked to hold a locking bolt in the ball member of the device, the bolt preventing actuation thereof to shift the gears.

It is also an object of this invention to provide locking means for the gear shift lever of a motor car transmission having a bolt adapted to be thrown by the lock in engaging position with the lever, the lock actuatable only by a proper key for the purpose.

It is also an object of this invention to provide a lock for a gear shift lever of a motor car transmission mounted in a rigid extension of the transmission housing and acting when operated to throw a bolt into engagement with the gear shift lever to prevent the same being moved for shifting of the gears.

It is furthermore an object of this invention to provide a locking device preferably operated by means of a pin cylinder lock to move means into engagement with the gear shift lever of a transmission to prevent movement thereof for shifting the gears.

It is finally an object of this invention to construct a device simple in operation and construction and in a convenient position for access, acting when actuated to operate concealed locking mechanism.

The invention (in a preferred form) is illustrated in the drawings and hereinafter more fully described.

In the drawings:

Figure 1 is a top plan view of a device embodying the principles of my invention shown associated with a conventional type of transmission.

Fig. 2 is an end view thereof.

Fig. 3 is a top plan view of the transmission with the cover plate of the shifting rods broken away.

Fig. 4 is a section taken on line 4—4 of Fig. 1, with parts shown in elevation.

Fig. 5 is a section taken on line 5—5 of Fig. 4, with parts shown in elevation.

Fig. 6 is a detail section taken on line 6—6 of Fig. 4, with parts shown in elevation.

Fig. 7 is a fragmentary view somewhat similar to Fig. 4, of a modified form of device.

Fig. 8 is a top plan view thereof.

Fig. 9 is a view similar to Fig. 7, of another modified form of device.

Fig. 10 is a top plan view thereof.

As shown in the drawings:

The transmission casing is denoted by the reference numeral 1, and is provided with a cover plate 2, having an integral central elevated extension 3, in which are mounted the throw rods 4 and 5, suitably connected by means, not shown, with the gears within the casing to shift the same. Secured upon said rods 4 and 5, are dogs 6 and 7, respectively, adapted to receive the lower end 8, of a gear shift lever 9, engaged therewith when said lever is rocked to one side or another and thrown rearwardly or forwardly, as the case may be, to shift the rods and the gears therewith. Formed or rigidly secured upon the gear lever 9, is a convex or ball shaped member 10, which fits into a socket member 11, formed integral with the upper extension 3, of the transmission cover, and adapted to be held movably therein by an interiorly concave collar 12, threaded into the upper portion of said ball shaped extension 11. The gear lever 9, and its lower extension 8, are thus permitted a universal movement to throw the tail portion from one side or to the other into engagement with either of the dogs 6 or 7, as the case may be, and forward or rearwardly to shift the same for the purpose of shifting the gears.

Rigidly secured on the interior of said housing extension 3, between the throw rods 4 and 5, is a recessed lug 13, adapted to receive the extension 8, of the gear lever engaged therein when the same is in neutral position or when the same moves through a neutral position, that is with the gear lever 9, substantially vertical, and when so disposed the lever is prevented from forward or rearward movement and can only swing laterally into engagement with either one or the other of the dogs 6 or 7, as the case may be. Formed upon each side of the socket member 11, as clearly shown in Figs. 4 and 6, are recessed bosses 14 and 15, respectively, the boss 15, being open at its end and having secured thereon a bracket member 16, slidable within which is a key or locking bolt 17, which, as shown in the position illustrated in Fig. 4, is capable of being moved through the boss 15, and through a key-way provided in the ball member 10, into the boss 14, thus locking the ball member from movement in its socket. Said bracket member 16, is rigidly braced in position by straps or bars 18, rigidly secured or formed integral therewith and secured on the cover plate 2, of the transmission casing.

Formed integral with said bracket member 16, is a barrel 19, within which is mounted any conventional type of lock 20, preferably a pin cylinder lock, and secured upon the rear end of the rotatable member of the lock is a depending arm or lever 21. The lower end of said arm or lever 21, engages in a slot provided therefor in the locking bolt 17, to actuate the same.

In the modified form of device illustrated in Figs. 7 and 8, I have shown the bracket member 16, provided with an integral dome shaped dust cap 22, which fits over a threaded portion of the gear shift lever 9, the threaded portion of the gear shift lever 9, in the present instance being denoted by the reference numeral 23, and provided with a nut 24, to hold said dust cap portion rigidly secured over the ball and socket connection of the device. In this construction it is obvious that the locking device is movable with the gear shift lever in all its positions, but when the locking bolt 17, is thrown into locking position all are held rigidly from movement.

In the modified form of device illustrated in Figs. 9 and 10, I have shown a retaining ring 25, for maintaining the ball member 10, in position in its socket, and formed integral with the bracket member 16, but the operation of the device and construction thereof is otherwise identical with that already described.

The operation is thought to be obvious from the description. However, in order to lock the gears from unauthorized operation, the gear lever 9, is moved to a central vertical or upright position, whereby the tail portion 8, is disposed within the stationary recessed lug 13, and the key is then inserted in the lock 20, and the rotatable member of the lock turned to operate the arm or lever 21, and throw the locking bolt 17, through the central key-way of the ball member 10, of the gear lever, the ends of the bolt of course engaging in the recessed bosses of the socket supporting member, thus preventing movement of the gear lever from neutral position.

I am aware that the details of construction may be varied through a wide range without departing from the principles of this invention, and I therefore do not purpose limiting the patent granted otherwise than necessitated by the prior art.

I claim as my invention.

In a device of the class described, the combination with a recessed transmission casing, and a ball and socket gear shift lever therefor, of a slotted bolt adapted to be projected through said casing and the ball of said lever and into the recess in the opposite side of said casing to hold the latter locked in a neutral position, an arm having one end engaged in the slot in said bolt, and a lock to which the other end of said arm is secured, and which operates said arm to move said bolt and to hold the same in either locked or unlocked position.

In testimony whereof I have hereunto subscribed my name in the presence of two subscribing witnesses.

JOHN H. IMHOFF.

Witnesses:
  EARL M. HARDINE,
  GEORGE R. MOORE.